United States Patent
Robison et al.

(10) Patent No.: US 7,117,431 B2
(45) Date of Patent: Oct. 3, 2006

(54) DIALOG BOXES TO SIMPLIFY WEB-BASED FORMS

(75) Inventors: Clayne B. Robison, American Fork, UT (US); Kent J. Diamond, Highland, UT (US)

(73) Assignee: Intel Corporation, Santa Clara, CA (US)

( * ) Notice: Subject to any disclaimer, the term of this patent is extended or adjusted under 35 U.S.C. 154(b) by 799 days.

(21) Appl. No.: 09/887,304

(22) Filed: Jun. 22, 2001

(65) Prior Publication Data
US 2002/0198903 A1   Dec. 26, 2002

(51) Int. Cl.
G06F 17/00   (2006.01)

(52) U.S. Cl. ...................... 715/507; 715/513
(58) Field of Classification Search ................ 715/507, 715/505, 506, 508, 513
See application file for complete search history.

(56) References Cited

U.S. PATENT DOCUMENTS

| | | | | |
|---|---|---|---|---|
| 6,239,797 B1* | 5/2001 | Hills et al. | ................. | 715/784 |
| 6,490,601 B1* | 12/2002 | Markus et al. | ............. | 715/507 |
| 6,499,041 B1* | 12/2002 | Breslau et al. | ............. | 715/505 |
| 6,651,217 B1* | 11/2003 | Kennedy et al. | ............ | 715/507 |
| 6,741,989 B1* | 5/2004 | Seltzer et al. | ................. | 707/9 |
| 2002/0013788 A1* | 1/2002 | Pennell et al. | ............. | 707/507 |
| 2002/0147743 A1* | 10/2002 | Le et al. | .................... | 707/505 |

\* cited by examiner

*Primary Examiner*—Sanjiv Shah
(74) *Attorney, Agent, or Firm*—Blakely, Sokoloff, Taylor & Zafman LLP

(57) ABSTRACT

The data entered into a form on a web-based secondary page can be combined with data entered into another form on a web-based main page, so that the data for both pages can be submitted to a server at the same time from a single form. The data from the form on the secondary page can also be copied into a hidden form on the main page, so that the most recently-entered data can be recalled from the hidden form if the secondary page is recalled.

24 Claims, 7 Drawing Sheets

DIALOG BOXES TO SIMPLIFY WEB-BASED FORMS

BACKGROUND OF THE INVENTION

1. Field of the Invention

The invention pertains generally to computer systems. In particular, it pertains to network-based forms on computer systems.

2. Description of the Related Art

Computer users are frequently asked to fill in information on a web page that has been provided over the Internet from a server, and then submit the completed information back over the Internet to the server. In normal operation, when a web page submits its data to a web server in this manner for processing, the data must all be present on one 'form' on the web page. The page may have multiple forms, but only one can be submitted to the server at a time for processing. This requires server-based applications to 'maintain state', or remember what has been submitted, between submissions, which can be very complex. To avoid the necessity of maintaining state, the creator of a web application may place all data fields that are related to a particular task within the same form so that when the form is submitted, the server has access to all of the modified data at the same time.

Unfortunately, there are often fields that do not require modification, or that should only be modified by advanced users. To steer end-users around these fields, web page designers often place all fields on the form but specify which fields are required and which are optional. This limitation forces the creation of pages that are visually complex and often confusing. The alternative is to place the seldom-accessed fields on a second page that is accessed from the first page only when needed. But because standard web browser and server architectures do not allow multiple forms to be submitted at the same time, the form associated with this second page must be submitted to the server separately from the form associated with the first page, which again requires the server to maintain state by keeping track of multiple forms being submitted by a single user at different times.

DETAILED DESCRIPTION OF THE INVENTION

Various embodiments provide for combining the data from a first page and the data from a second page into a single form for submission to a server at one time. A page is submitted when the user clicks a button labeled 'OK', 'Done', or something similar, or takes some other action to indicate that data entry for that page is finished and the data is to be delivered or processed. Web page owners may implement this combined-form submission by placing script, such as Java script, into the pages that are downloaded to the client web browser in response to requests over the Internet. When a secondary page is requested from the main page, the user may input data into the form associated with the secondary page and submit the page. Rather than posting the form from the secondary page back to the server, the script may direct that values from that form instead be used to update values on a hidden form in the main page. If the secondary form is re-requested, the previously updated data from the hidden form may be submitted to the server and placed into the secondary form before it is downloaded, thus restoring the data previously entered in the secondary form while relieving the server from having to keep up with this data. The user may then edit his previous inputs on the secondary form before submitting it again, and have those edited inputs again saved to the hidden form. When the main page is subsequently submitted, the script may direct that the data from the hidden form be copied into the main form and the main form then be posted to the server. In this manner, optional or advanced inputs may be reserved for a secondary form that the user does not have to see unless he wants to, but these optional inputs can be submitted to the server at the same time as the main inputs in a single form, thus relieving the server from having to maintain state between submissions.

By implementing these operations in script that is downloaded with the web pages, neither standard browsers nor standard servers need to be modified. By placing the script into the web pages, the Internet service providers (ISPs) may provide their services in a conventional manner, and the browsers in the user's machines may receive and execute the script. Only those web-page owners who wish to implement an embodiment of the invention need program their web pages to perform in the manner described herein. In the context of this disclosure, the term 'ISP' may include not only Internet service providers, but also Hosting and Application service providers.

Figure 1:
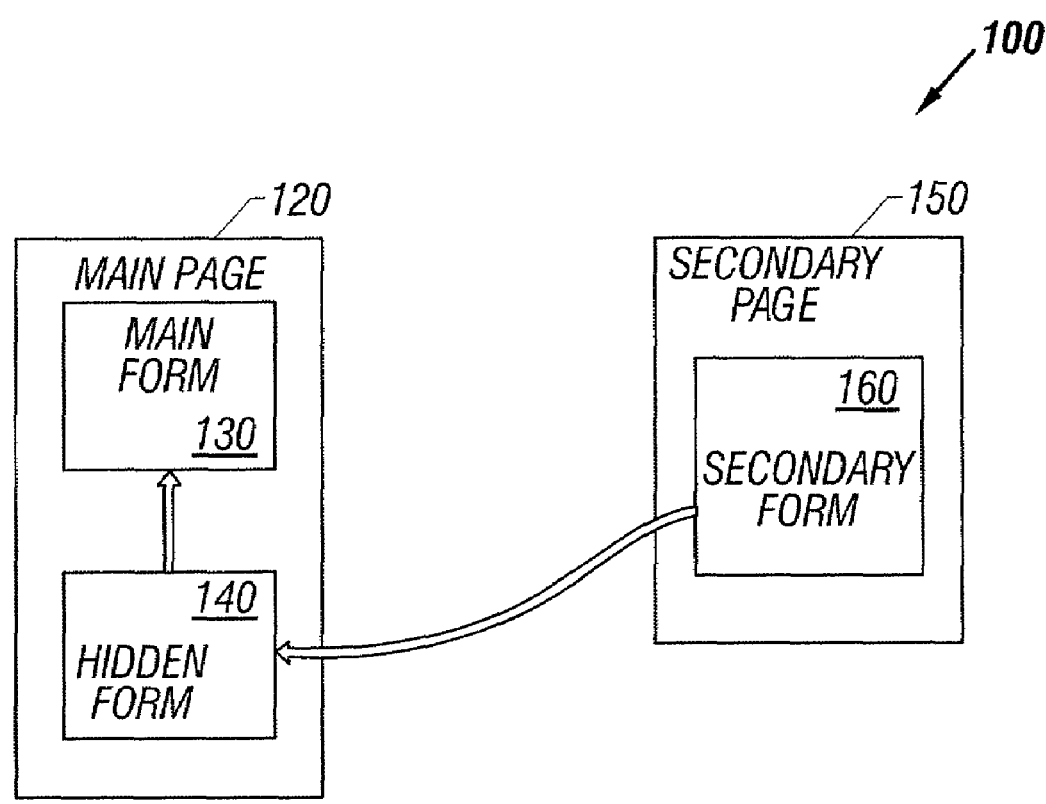
FIG. 1 shows a basic diagram of a system.

FIG. 1 shows a basic operation 100. A main page 120 may contain main form 130, which includes visible fields for the user to fill out, and a hidden form 140, which includes hidden fields that the user does not have direct access to. By clicking on a specified button in main page 120, the user can request a secondary page 150 that contains secondary form 160, which includes optional visible fields in which the user may enter data. The term 'secondary', as used herein, may refer to the window, page, or form that result when they are requested of the server from the main page. When the user submits secondary page 150, the contents of secondary form 160 may be used to update the values in hidden form 140, where they can remain while user focus is returned to the main page. When the user submits main page 120, the contents of form 140 may be first used to update the values in appropriate fields of form 130, and then the contents of form 130 may be submitted to a server. In this manner, all the information from two forms on two pages may be submitted to the server at one time, so that the server does not have to maintain state while the user is working with the main and/or secondary pages.

Figure 2:
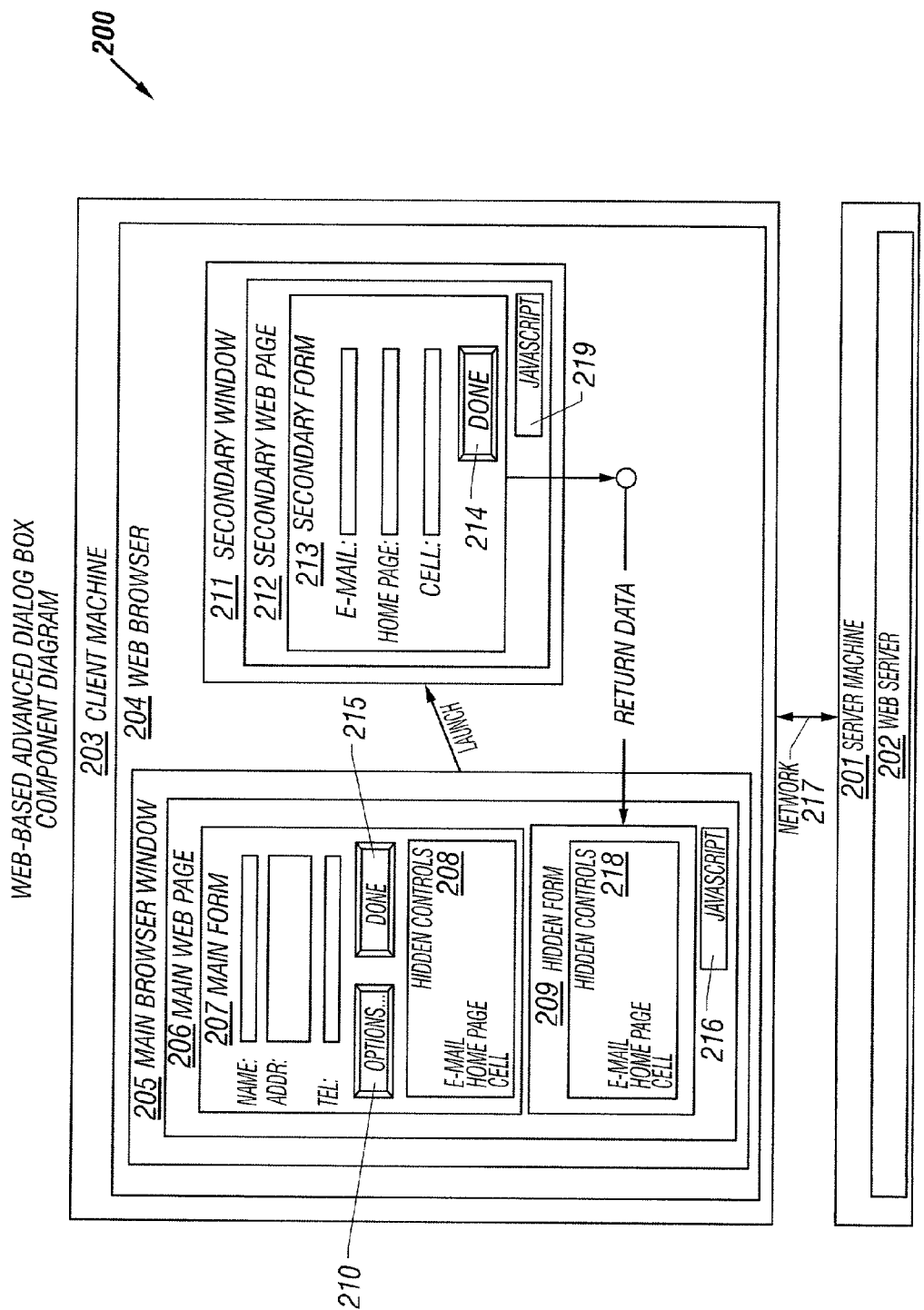
FIG. 2 shows a more detailed diagram of a system.

FIG. 2 shows a more detailed view of a system embodiment 200. Server machine 201 may contain server software 202, which provides network services over network 217 to a client machine 203 containing browser software 204. In one embodiment, network 217 may be the Internet, server machine 201 can be a server operated by an Internet service provider (ISP), server software 202 may be web server software, client machine 203 may be a personal computer (PC), and browser software 204 may be a web browser. In operation, a user may call up a main web page 206 from server machine 201 that is displayed in a main browser window 205 on client machine 203.

Main web page 206 may include a main form 207, which contains various displayed fields that the user may fill in or otherwise enter data into. Fields may be referred to as 'controls' in the software that manages these fields. In the illustrated example, main form 207 includes fields for the user to enter his or her name, address, and telephone number. Main form 207 may also contain hidden controls 208, with various non-displayed fields the user does not see and cannot directly enter data into. In the illustrated embodiment, these fields are shown as being for E-mail, home page, and cell phone information.

Main web page 206 may also include a hidden form 209, which may contain hidden controls 218 that duplicate hidden controls 208. Hidden form 209 may be used as temporary storage for information that the user does not see while working with main page 206. Main page 206 may also include script 216, to provide instructions to control the operation of main page 206. In one embodiment, script 216 is Java Script, but other forms of instructions may also be used.

Main web page 206 may also contain two displayable buttons for the user to click on. The user may click on 'Done' button 215 to submit main form 207 to server machine 201. Alternately, the user may click on 'Optional' button 210 to request a secondary page from server machine 201. Although these buttons are shown labeled as 'Done' and 'Optional', they may also be given other labels without departing from the spirit of the invention. In the illustrated embodiment, when the user requests a secondary page by clicking on Optional button 210, web server software 202 may respond by sending secondary web page 212, which may be displayed in secondary window 211 by web browser 204 on client machine 203. In one embodiment, existing main window 205 may remain active but be hidden from view by overlaying it with secondary window 211. Secondary web page 212 may include secondary form 213, which may include displayable user-accessible fields that are not displayed on main web page 206. In the illustrated embodiment, these fields are for information on the user's e-mail address, home page web address, and cell phone number. These duplicate the fields of hidden controls 218 and hidden controls 208 of main form 207.

When the user has entered data into secondary form 213, he can click on 'Done' button 214 to submit the secondary page. As before, this button may have another label. When button 214 is clicked, rather than submitting form 213 to the server in the normal manner, script 219 may cause the contents of form 213 to be copied into the equivalent fields of hidden form 209. In one embodiment, script 219 is Java script. Secondary window 211 may then be closed in the normal manner, and user control returned to main form 207. The user may then continue to edit main form 207, submit main page 206, or request secondary page 212 again by clicking 'Optional' button 210. If secondary page 212 is requested again, the updated contents of hidden form 209 may be posted to the server and placed into the newly-created secondary form by the server before the server transmits the secondary form to browser 204. In this manner, the values of the fields in secondary form 213 may be saved, re-accessed, and re-edited as long as the user remains in session with main web page 206.

When the user has submitted secondary web page 212 and returned to main web page 206, he may submit main web page 206 to the server by clicking on the 'Done' button 215. In one embodiment, this triggers the contents of hidden controls 218 in hidden form 209 to be copied into hidden controls 208 in main form 207. Now that all the user-entered data is contained in main form 207, main form 207 may be submitted to the server and the main window 205 closed in client machine 203. In this embodiment, the data in hidden form 209 is not copied into main form 207 until the user clicks Done button 215 to submit main web page 206 to the server. In another embodiment, when the user clicks Done button 214 to submit secondary web page 212, the contents of secondary form 213 are copied to both hidden form 209 and main form 207. If the user requests secondary page 212 again, hidden form 209 may be posted to the server and the data transferred into newly-created secondary form 213 as in the other embodiment. When the user submits secondary web page 212 by clicking Done button 214, the data can again be copied from secondary form 213 to both hidden form 209 and main form 207. When the user later clicks Done button 215 to submit main web page 206, the data does not have to be copied from hidden form 209 to main form 207 because the updated data is already in main form 207. Therefore, main web page 206 may be submitted directly to server 201 without copying any data from hidden form 209 first. In both embodiments, hidden form 209 may be used to temporarily store the data previously entered into secondary form 213 by the user, so that this data may be restored to the newly-created secondary form 213 if the user later recalls secondary page 212 during the same session, without having to rely on the server to maintain this information.

Figure 3A:
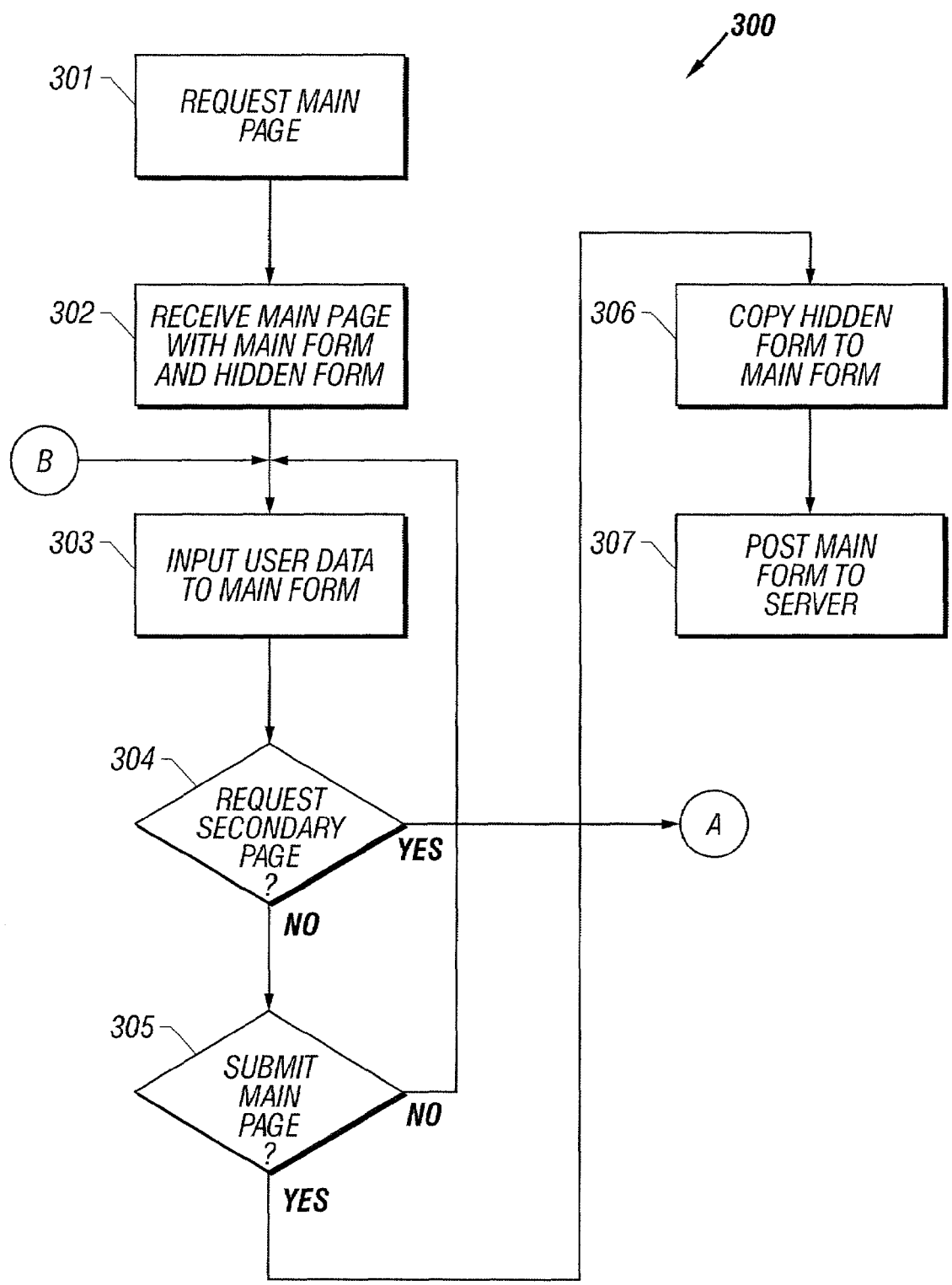
FIGS. 3A and 3B show a flow chart of a method embodiment.
Figure 3B:
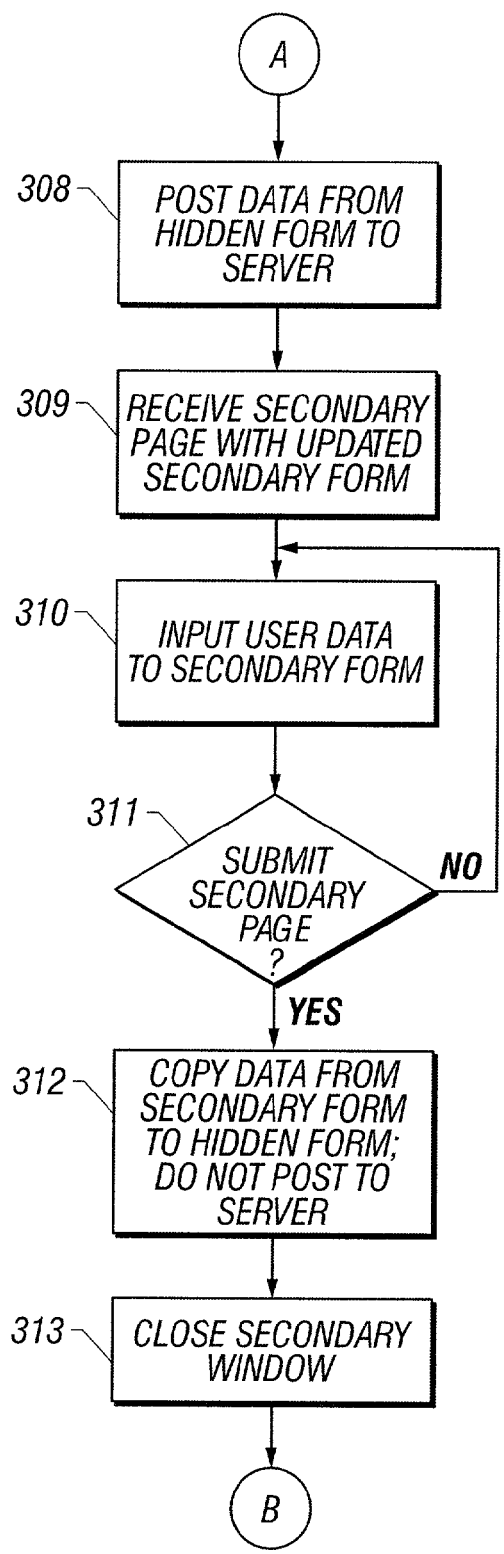

FIGS. 3A and 3B show a flow chart 300 of one embodiment of a process followed by a client machine, which may be a personal computer (PC). At block 301, the browser in the PC may request a main page from a server. At block 302, the main page, which may include a main form and a hidden form, is received by the browser and the main page is displayed to the user. At this point, the fields in the hidden form may be empty. At block 303, any data entered by the user may be input to the fields of the main form. If the user does not input any data at this point, this block may be skipped. Blocks 304 and 305 may test to see if certain buttons or icons on the main page were clicked by the user. Block 304 determines if a secondary page is being requested. In one embodiment, this may be triggered by the user by clicking on the 'Optional' button on the display as previously described. If a secondary page was not requested, block 305 determines if the main page is being submitted. In one embodiment, this may be triggered by the user clicking on a 'Done' button or 'OK' button as previously described. If the secondary page is not being requested and the main page is not being submitted, control may loop through blocks 303–305 to wait for more inputs from the user.

However, if the secondary page is not being requested but the main page is being submitted, control may move to block 306, where the fields of the hidden form may be copied to equivalent fields of the main form. If the secondary page was never requested by the user, the fields of the hidden form may be empty and these empty fields may be copied into the main form. In one embodiment, the fields of the main form that equate to the fields of the hidden form are not displayed to the user on the main page. The main form, including the just-copied contents of the hidden form, may then be posted to the server at block 307. If no data was present in the hidden form, then the equivalent fields of the main form may contain no data when the main form is posted to the server.

Returning to block 304, if the secondary page is requested, control may move to block 308 in FIG. 3B, where the contents of the hidden form in the main page are posted to the server. The server may place the contents of the hidden form into the requested secondary form. The server may then transmit the requested secondary page, including the secondary form containing these contents, back to the browser. Since these operations occur in the server, they are not shown in FIG. 3B. If the hidden form was initially empty, the fields of the secondary form will likewise be empty after block 308. At block 309 the requested secondary page, along with its associated secondary form, is received from the server by the browser and displayed to the user in a secondary window. If the user enters data into the fields of the secondary form, this data is input at block 310. Block 311 checks to see if the secondary page is being submitted. In one embodiment, this may be triggered by the user clicking on a 'Done' button or an 'OK' button on the display, as previously described. If the secondary page is not being submitted, control loops between blocks 310 and 311 while waiting for more user inputs. If the secondary page is being submitted, the data from the secondary form may be copied to the hidden form of the main page at block 312. Unlike conventional systems, the data from the secondary form may not be posted to the server at this point. After the data is copied to the hidden form, the secondary window may be closed at block 313, and control may be returned to block 303 of FIG. 3A. At this point, the main page may again be displayed to the user, who may use the opportunity to input more data to the main form. The user may also request the secondary page again, in which case blocks 308 through 313 may be followed as before. Since the hidden form now has the data that was copied from the last instance of the secondary page, that data may be posted to the server at block 308 and placed into the newly requested secondary page at block 309. In this manner, the contents of the secondary page can be remembered by the main page and restored anytime the secondary page is re-requested from the server during the same session with the main page. This relieves the server from having to maintain state by remembering that data. As before, the user may edit the secondary form and then submit the secondary page, which copies the edited data to the hidden form and returns user control to the main page. The user may alternately move between the main and secondary pages in this manner as many times as desired. The user may then submit the main page, which copies the data from the hidden form to the main form and then posts the main form to the server.

Figure 4:
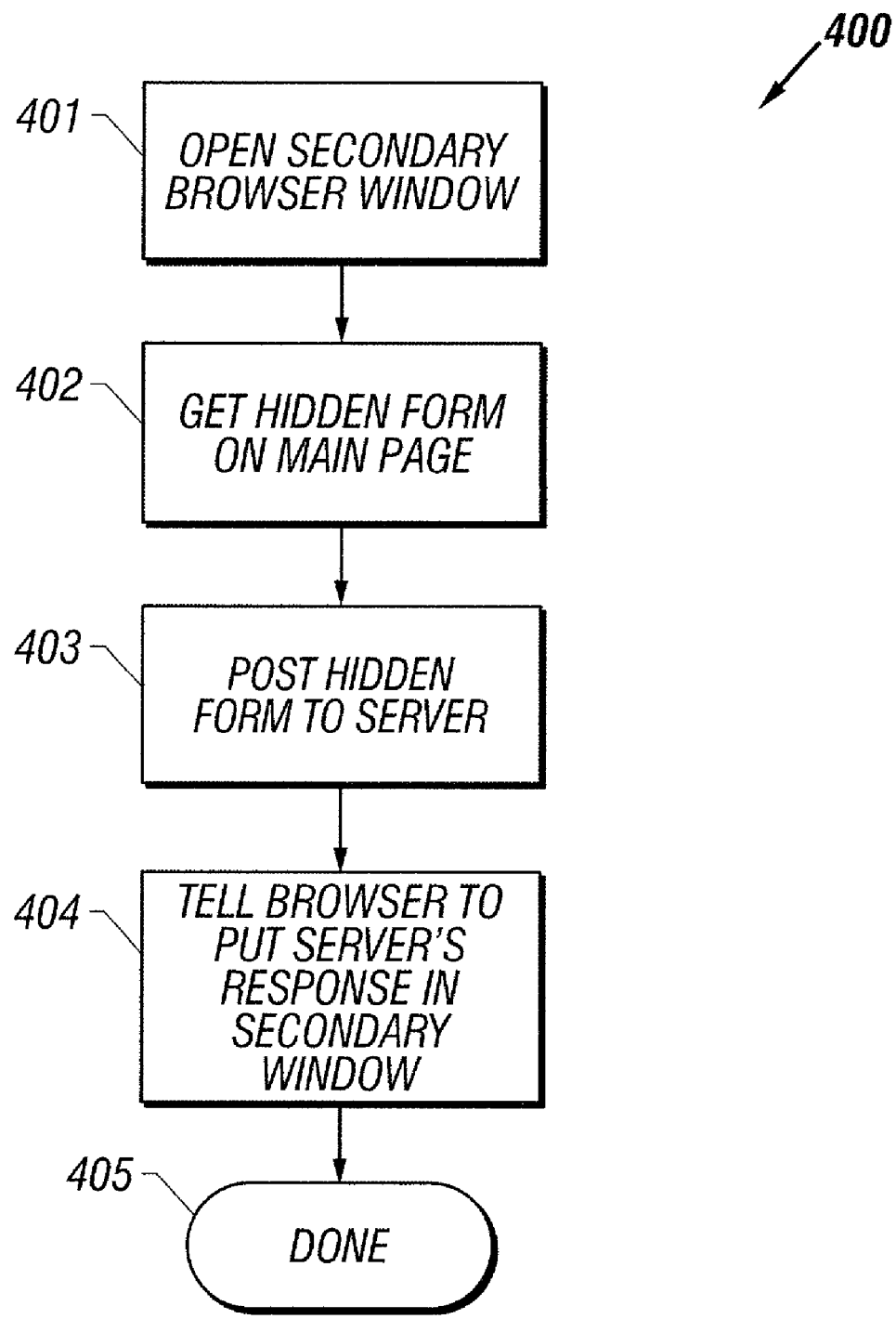
FIG. 4 shows a flow chart of a first script operation.
Figure 5:
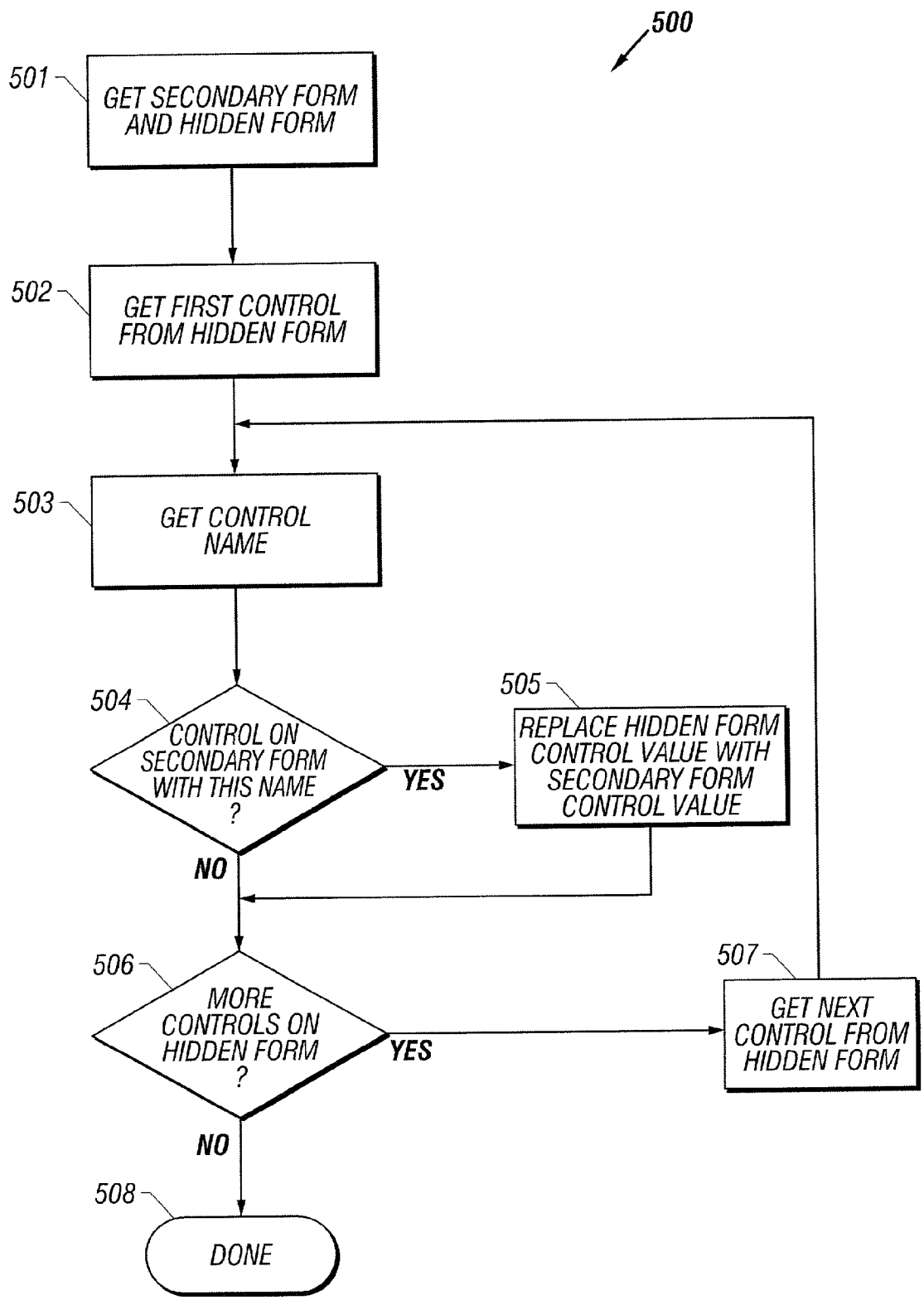
FIG. 5 shows a flow chart of a second script operation.
Figure 6:
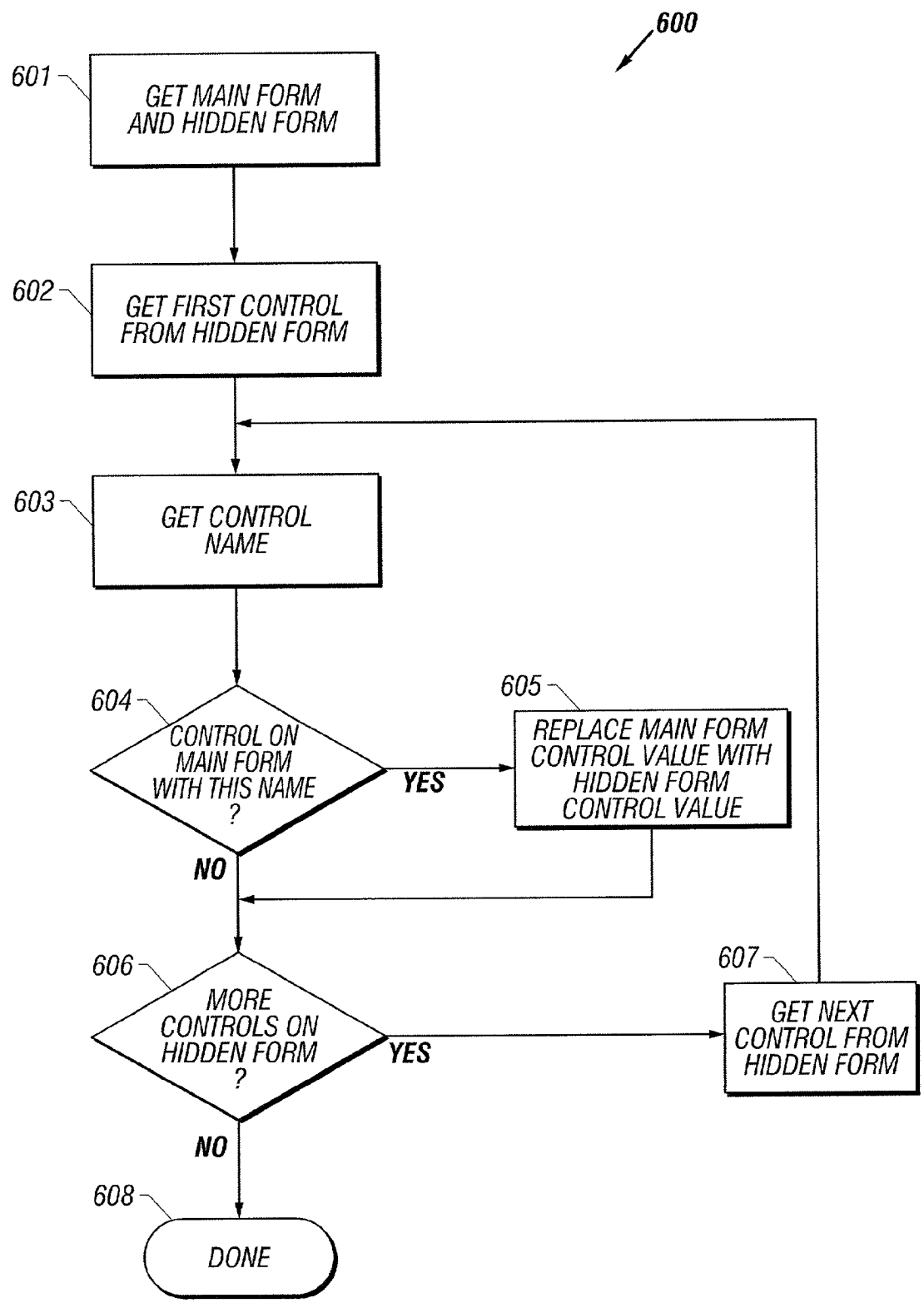
FIG. 6 shows a flow chart of a third script operation.

FIGS. 4, 5, and 6 show flow charts of script that may be used in the browser to implement the aforementioned features. FIG. 4 shows a flow chart 400 of script that may be called when the user clicks the 'optional' button on the main page, or otherwise requests from the main page that the secondary page be downloaded from the server to the browser. The script represented in FIG. 4 may initially be downloaded from the server to the browser when the main page and main form are downloaded to the browser. At block 401, the script may open a new secondary browser window to contain the requested secondary form. At block 402, the script may get the hidden form associated with the main page. At block 403, the script may submit this hidden form to the server by posting the hidden form to the server along with the request for the secondary page. In response, the server may place the data from this hidden form into the secondary form that has been requested, before downloading that secondary form to the browser in the client machine. In effect, this may cause data previously entered by the user into a secondary form to be restored into the newly requested secondary form. However, the operation of the server is not directly controlled by script running in the browser, so there is no block in FIG. 4 to show the server's response. At block 404, the script tells the browser to put the secondary form received from the server into the new secondary window that was opened in block 401. Block 405 indicates the end of this sequence.

FIG. 5 shows a flow chart 500 of script that may be called when the user is finished editing fields on the secondary page. This script may update the values in the hidden form of the main page with values from the secondary form of the secondary page. This script may be called when the user clicks the 'OK' or 'Done' button on the secondary page, or otherwise signifies that he or she wishes to return to the main page. The script represented in FIG. 5 may initially be downloaded to the browser when the secondary page and secondary form are downloaded to the browser.

At block 501, the script may get the secondary form and the hidden form. In one embodiment, getting these two forms requires at least two separate instructions, but they are shown in a single block in FIG. 5 for simplicity. At block 502, a first control is read from the hidden form. In one embodiment, a 'control' may be defined as the script's reference to a field in a form that may receive data input by the user. At block 503, the name of the control is obtained. In one embodiment, the name of the control may identify which field is being processed. The name may also serve to identify the equivalent field in another form if the same name is used in both forms for the same field. Block 504 determines whether an equivalent field exists in the secondary form by determining if the just-obtained control name also exists in the secondary form. If it does, block 505 copies the value for that field from the secondary form to the hidden form by replacing the control value in the hidden form with the identically named control value from the secondary form, before going to block 506 to check for more controls. If block 504 determines that duplicate control names do not exist in both forms, block 505 may be skipped. If block 506 determines that no more controls remain on the hidden form, this script may end at block 508. However, if more controls remain to be processed (more fields are to be copied), block 507 may get the next control from the hidden form and return to block 503 to process this next control in the same way. The loop through blocks 503–507 may continue in this manner until all controls in the hidden form have been processed, at which point the script may end at block 508. In one embodiment, the control names in a form may be placed in a list, so that blocks 503–507 sequentially process the items in the list.

Although FIG. 5 and the associated text describe controls being retrieved from the hidden form and the secondary form being searched for a match, another embodiment uses the opposite approach—the controls are retrieved from the secondary form, and the hidden form is searched for a match.

FIG. 6 shows a flow chart 600 of script that may be called when the user is finished editing fields on the main page and, if applicable, the secondary page, and wishes to submit the edited data to the server from the main page. This script may update the values in the main form of the main page with values from the hidden form of the main page. This script may be called when the user clicks the 'OK' or 'Done' button on the main page, or otherwise signifies that he or she wishes to submit the main page to the server. The script represented in FIG. 6 may initially be downloaded from the server to the browser when the main page, main form, and hidden form are downloaded to the browser.

At block 601, the script gets the main form and the hidden form. In one embodiment, getting these two forms requires at least two separate instructions, but they are shown in a single block in FIG. 6 for simplicity. At block 602, a first control is read from the hidden form. At block 603, the name of the control is obtained. In one embodiment, the name of the control may identify which field is being processed. The name may also serve to identify the equivalent field in another form if the same name is used in both forms for the same field. Block 604 determines whether an equivalent field exists in the main form by determining if the just-obtained control name also exists in the main form. If it does, block 605 copies the value for that field from the hidden form to the main form by replacing the control value in the main form with the identically named control value from the hidden form, before going to block 606 to check for more controls. If block 604 determines that duplicate control names do not exist in both forms, block 605 may be skipped. If block 606 determines that no more controls remain on the hidden form, this script may end at block 608. However, if more controls remain to be processed (more fields are to be copied), block 607 may get the next control from the hidden form and return to block 603 to process this next control in the same way. The loop through blocks 603–607 may continue in this manner until all controls in the hidden form have been processed, at which point the script may end at block 608. In one embodiment, the control names in a form may be placed in a list, so that blocks 603–607 sequentially process the items in the list.

Although FIG. 6 and the associated text describe controls being retrieved from the hidden form and the main form being searched for a match, another embodiment uses the opposite approach—the controls are retrieved from the main form, and the hidden form is searched for a match.

The invention may be implemented in hardware or as a method. The invention may also be implemented as instructions stored on a machine-readable medium, which can be read and executed by at least one processor to perform the functions described herein. A machine-readable medium includes any mechanism for storing or transmitting information in a form readable by a machine (e.g., a computer). For example, a machine-readable medium can include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

The foregoing description is intended to be illustrative and not limiting. Variations will occur to those of skill in the art. Those variations are intended to be included in the invention, which is limited only by the spirit and scope of the appended claims.

We claim:

1. A method, comprising:
    displaying a first page having a first form and a hidden form;
    receiving user-provided data into the first form of the first page;
    displaying a second form of a second page when the second form is requested via the first page;
    receiving user-provided data into the second form of the second page;
    copying the data from the second form of the second page to the hidden form of the first page without posting the data from the second form to a server; and
    posting the data from the first form and the hidden form to the server when the first page is submitted.

2. The method of claim 1, further comprising:
    subsequent to the posting, copying the data from the hidden form to the first form from when the first page is submitted.

3. The method of claim 1, wherein:
    copying the data to the hidden form is triggered by submitting the second page.

4. The method of claim 1, wherein:
    the first and hidden forms are associated with a main window; and
    the second form is associated with a secondary window requested by an operation associated with the main window.

5. The method of claim 1, wherein:
    the copying and the posting is performed by a browser.

6. The method of claim 1, wherein:
    the first and second pages are web pages.

7. A method, comprising:
    requesting, from a server, a first web page having a first form and a hidden second form;
    requesting, from the server, a second web page having a third form;
    submitting the second web page by copying user-provided data from the third form to the hidden second form and not posting data from the third form to the server;
    copying data from the hidden second form to the first form; and
    submitting the first web page by posting data from the first form to the server.

8. The method of claim 7, wherein:
    copying data from the second form is triggered by submitting the second web page.

9. The method of claim 7, wherein:
    copying data from the second form is triggered by submitting the first web page.

10. The method of claim 7, wherein:
    requesting a first web page includes creating a main window.

11. The method of claim 7, wherein:
    requesting a second web page includes creating a secondary window.

12. The method of claim 7, wherein:
    requesting a second web page includes updating the third form with previously saved data from the second form.

13. A machine-readable medium that stores instructions on physical storage device, which instructions when executed by at least one machine, cause the at least one machine to perform operations comprising:
    displaying first page having a first form and a hidden form;
    receiving user-provided data into the first form of the first page;
    displaying a second form of a second page when the second form is requested via the first page;
    receiving user-provided data into the second form of second page;
    copying the data from the second form of the second page to the hidden form of the first page without posting the data from the second form to a server; and
    posting the data from the first form and the hidden form to the server when the first page is submitted.

14. The medium of claim 13, further comprising:
    subsequent to the posting, copying the data from the hidden form to the first form from when the first page is submitted.

15. The medium of claim 13, wherein:
    copying the data to the hidden form is triggered by submitting the second page.

16. The machine-readable medium of claim 13, wherein:
data is copied substantially directly from the first form to the second form and from the second form to the hidden form.

17. The machine-readable medium of claim 13, wherein:
the first form comprises fields for a first information set that supplements a second information set collected from a user in a form of the second page.

18. The machine-readable medium of claim 17, wherein:
the first information set comprises information that a user may optionally provide and the second information set comprises information that a user must provide.

19. A system, comprising:
a client computer having a web browser;
a server computer coupled to the client computer through a network to provide to the client computer:
  a first web page having a displayable first form and a hidden second form; and
  a second web page having a displayable third form; and
a set of instructions to cause the client computer to copy data entered by a user in the displayable third form to at least one of the first and hidden second forms, without posting the data to the server when the second web page is submitted and to cause the client computer to post the copied data to the server computer when the first web page is submitted.

20. The system of claim 19, wherein:
the set of instructions includes instructions to cause the client computer to copy data entered in the displayable third form to the hidden second form when the second web page is submitted and to copy data in the hidden second form to the first form when the first web page is submitted.

21. The system of claim 19, wherein:
the set of instructions includes instructions to cause the client computer to copy data entered in the displayable third form to both the first and hidden second forms when the hidden second web page is submitted.

22. An apparatus, comprising:
a server computer coupled to a client computer through a network to:
  respond to a first request by the client computer by providing a first script and a main page having a main form and a hidden form, the first script to copy a content of the hidden form into the main form before submitting the main form to the server; and
  respond to a second request by the client computer by providing a second script and a secondary page having a secondary form, the second script to copy user-provided content of the secondary form into the hidden form and not post the content of the secondary form to the server when the secondary page is submitted.

23. The apparatus of claim 22, wherein:
the network is the Internet.

24. The apparatus of claim 22, wherein:
the first request is for a main web page and the second request is for a secondary web page.

* * * * *